Nov. 1, 1966  G. P. HROMADKA  3,283,119
PROCESS AND APPARATUS FOR RESISTANCE SPOT SOLDERING
Filed June 20, 1963 2 Sheets-Sheet 1
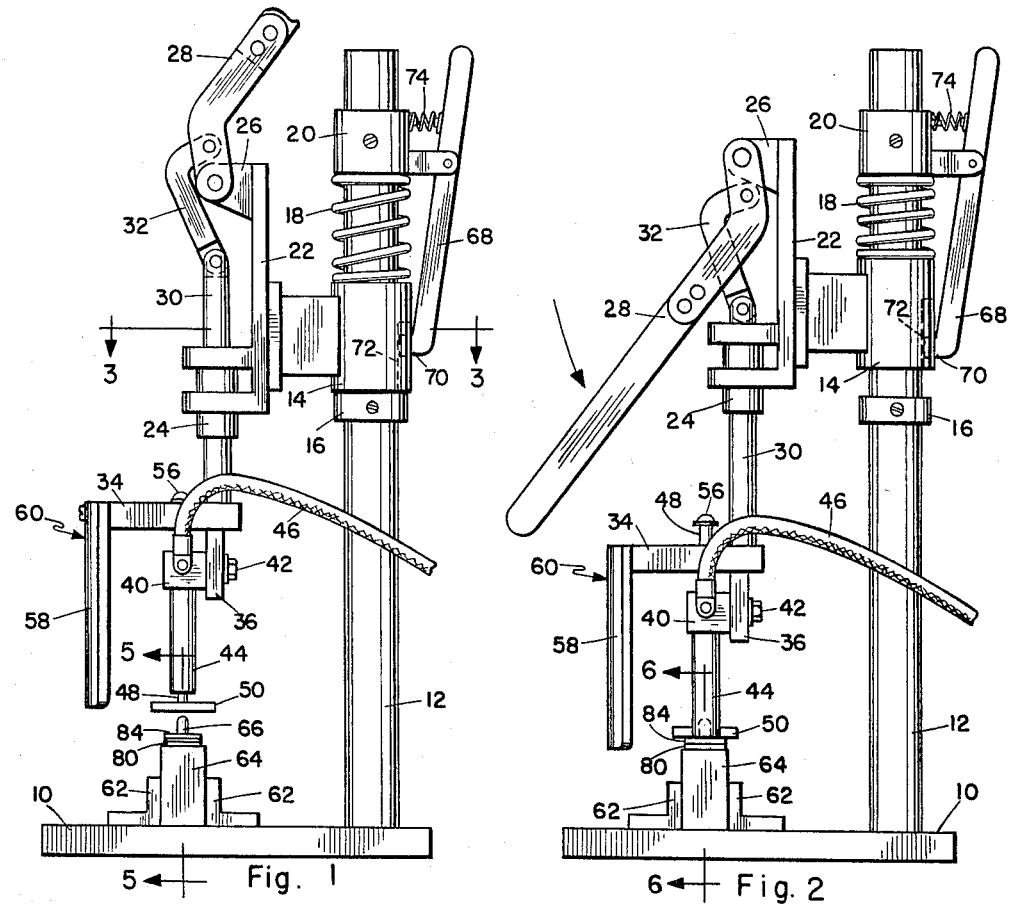
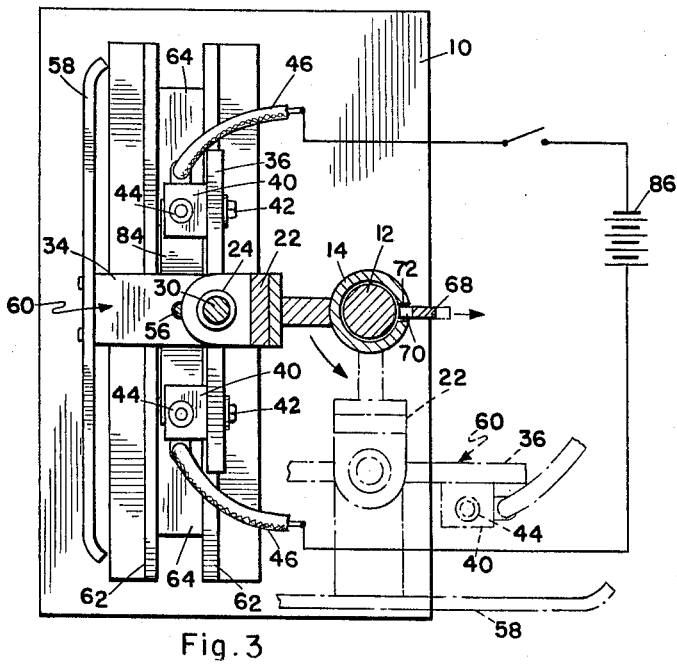
*INVENTOR.*
GEORGE P. HROMADKA
BY
*Knox & Knox*

Nov. 1, 1966   G. P. HROMADKA   3,283,119

PROCESS AND APPARATUS FOR RESISTANCE SPOT SOLDERING

Filed June 20, 1963 2 Sheets-Sheet 2

INVENTOR.
GEORGE P. HROMADKA
BY Knox & Knox

United States Patent Office 3,283,119
Patented Nov. 1, 1966

3,283,119
PROCESS AND APPARATUS FOR RESISTANCE SPOT SOLDERING
George P. Hromadka, Torrance, Calif., assignor to The Ryan Aeronautical Co., San Diego, Calif.
Filed June 20, 1963, Ser. No. 289,353
1 Claim. (Cl. 219—85)

The present invention relates to soldering and more specifically to a process and apparatus for resistance spot soldering.

The primary object of this invention is to provide apparatus which will solder a pair of connections simultaneously utilizing the heat of electrical resistance through the part between the connections.

Another object of this invention is to provide apparatus in which the parts to be soldered are held in accurate alignment while soldering, yet are easily inserted and removed without the need for clamps or the like.

Another object of this invention is to provide soldering apparatus incorporating a heat sink, which is automatically applied during soldering to remove excess heat from the area of the part not required to be heated.

A further object of this invention is to provide apparatus in which pressure on the soldered connection during soldering can be accurately controlled and maintained until the joint is cool.

With these objects in view the invention consists in the novel combination and arrangement of elements as described in the specification, pointed out in the claim and illustrated in the drawings, in which:

FIGURE 1 is a side elevation view of the apparatus ready for use;

FIGURE 2 is a side elevation view thereof with a part being soldered;

FIGURE 3 is a sectional view taken on line 3—3 of FIGURE 1;

Similar characters of reference indicate similar or identical elements and portions throughout the specification and throughout the views of the drawing.

Structure

Figure 4:
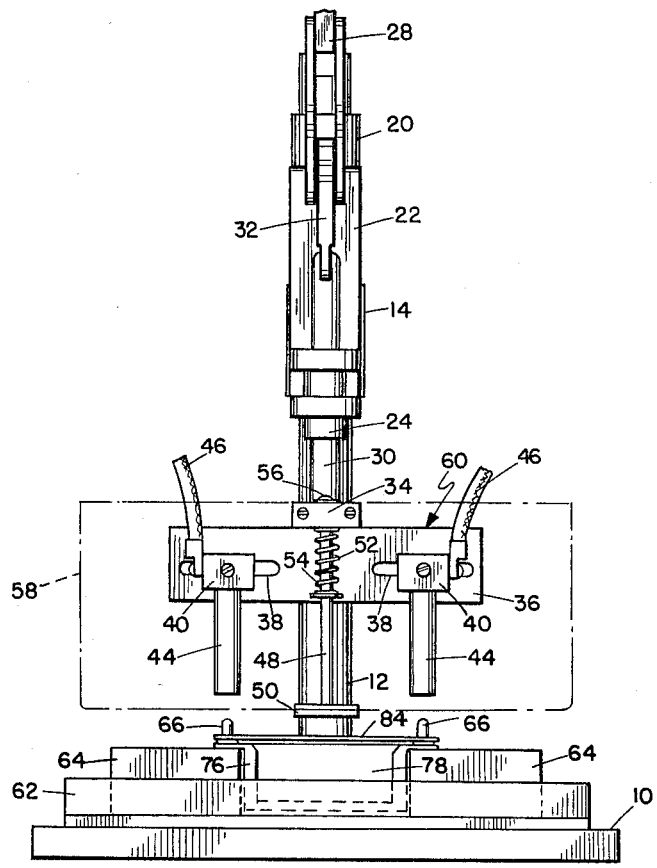
FIGURE 4 is a front elevation view with the apparatus in the position of FIGURE 1.

The apparatus includes a suitable base 10 on which is fixed an upright rigid post 12, said base being a flat plate element for portability, or being a portion of a work bench in a permanent installation as for volume production. Vertically slidable on post 12 is a sleeve 14 supported on a stop collar 16, which is adjustably securable to said post to set the nominal height of the sleeve above base 10. Above sleeve 14 is a compression spring 18 retained by an upper retaining collar 20 also adjustably secured to post 12, so that the assembly can be located at any position on the post and the spring pressure biasing the sleeve 14 downwardly can be adjusted to suit requirements. Fixed to sleeve 14 is a bracket 22 having at its lower end a guide bushing 24 axially parallel to the post 12. On the upper end of bracket 22 is a radially extending lug 26 on which is pivotally mounted a vertically swingable handle 28. Axially slidable in guide bushing 24 is a ram 30, the upper end of which is coupled by a toggle link 32 to the handle 28. By raising handle 28 the ram 30 is thus lifted, as in FIGURE 1, and by lowering said handle the ram is forced downwardly, toggle link 32 being connected so that an over center locking action occurs in the downward position of said handle to hold the ram in place, as in FIGURE 2. Various configurations of locking type toggle mechanisms may be used, that illustrated being typical of well known devices.

On the lower end of ram 30 is a forwardly projecting support bar 34, below which is a cross bar 36 extending laterally on either side and having a pair of horizontally elongated slots 38, one on each side of the center. Mounted on the cross bar 36 are electrode holders 40 held by clamp bolts 42 through the slots 38, so that the horizontal spacing of the electrode holders is adjustable. Secured in the electrode holders 40 are vertically downwardly extending tubular electrodes 44, held by any suitable screw or clamp means, with connections to power supply cables 46. Either the cross bar 36 or electrode holders 40 are of non-conductive material, or other insulative means can be used to prevent direct connection between the electrodes 44.

Mounted on support bar 34 and vertically slidable therethrough is a support rod 48, at the lower end of which is fixed a flat plate element comprising a heat sink 50, disposed between electrodes 44 and extending slightly below the lower ends thereof. Heat sink 50 is biased downwardly by a spring 52 between support bar 34 and a fixed stop 54 on the support rod 48, the upper end of said support rod being retained by a stop screw 56 above the support bar. Attached to the forward end of support bar 34 is a transparent shield 58 to protect the operator during the soldering operation. The ram 30 and all parts attached thereto to move as a unit comprise the soldering head 60.

Secured to base 10 are rails 62 between which are clamped support blocks 64 of heat resistant, non-conductive material such as Teflon or the like. The rails 62 provide a convenient means for holding blocks 64 while allowing for spacing adjustment, but other securing means may be used depending on the specific use. Fixed in the blocks 64 are upwardly projecting locating pins 66 which are aligned to fit into the tubular electrodes 44 when the ram assembly is lowered.

For convenience of use it is desirable that the soldering head 60 be movable to the side. This can be accomplished by means of a locking bar 68 pivotally mounted on retaining collar 20 and having a tongue 70 which seats into a vertically elongated slot 72 in sleeve 14. Locking bar 68 is biased by a spring 74 to hold tongue 70 in the slot 72, which prevents rotation of the sleeve 14 but still allows vertical sliding motion. By squeezing the upper end of locking bar 68 toward post 12, the tongue 70 is removed from slot 72, allowing the sleeve and the entire soldering head 60 with its actuating mechanism to be swung to the side, as indicated in broken line in FIGURE 3. This provides free access to the support blocks 64 for assembly of parts to be soldered.

Operation

The apparatus as illustrated is set up to solder together the two frame components of a transformer, but it will be obvious that by using various support blocks and locating pin arrangement, many different assemblies can be made. To facilitate loading of the parts to be soldered the soldering head 60 is swung to the side as described above.

Figures 5, 6:
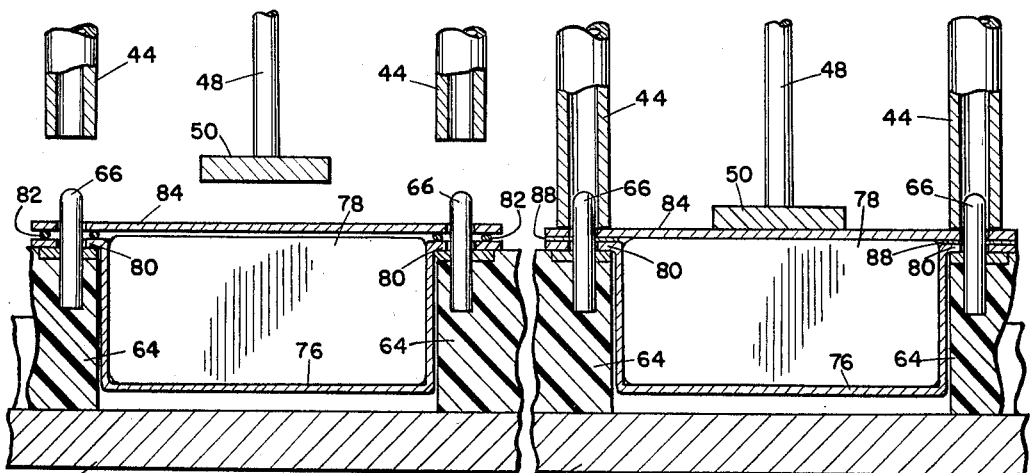
FIGURE 5 is an enlarged sectional view taken on line 5—5 of FIGURE 1.
FIGURE 6 is an enlarged sectional view taken on line 6—6 of FIGURE 2.

With reference to FIGURE 5, the frame 76 with a transformer unit 78 therein is placed between blocks 64 with the mounting tabs 80 held on locating pins 66. Solder is then applied cold in the form of rings of wire type solder 82 around the locating pins. The base plate 84 of the transformer is then placed over the locating pins 66, which automatically align the parts in proper position. The areas to be soldered are, of course, pre-fluxed as necessary.

The soldering head is swung back into operating position and locked in alignment by the locking bar 68. The handle 28 is then pulled down to lower the soldering head 60 and bring the electrodes 44 down over locating pins 66, the full down position of the handle forcing the electrodes against the parts to be soldered.

The vertical position of sleeve 14 is set so that the working travel of the soldering head 60 is greater than the initial clearance between the ends of the electrodes 44 and the parts to be soldered. Thus the electrodes are stopped before the end of their travel and the remainder of the motion of handle 28 causes the sleeve 14 to be lifted from stop collar 16 against spring 18, which provides the clamping pressure on the parts, as in FIGURE 2. At the same time heat sink 50 is pressed against the base plate 84 by the pressure of spring 52.

When electrical current is applied to the electrodes 44 as from a D.C. power source 86 indicated diagrammatically in FIGURE 3, the current flows between the electrodes through the parts being soldered, primarily through base plate 84. The electrical resistance of the base plate causes heat which melts the solder at both electrodes simultaneously, as indicated at 88 in FIGURE 6, and makes the proper joint. Excess heat in base plate 84 is carried away by heat sink 50, to prevent discoloration and possible heat damage to the transformer. The actual heating is applied for only a short period and the electrodes are left clamped in place as the solder cools, ensuring a proper bond. Once the apparatus is initially positioned on the post 12 that the sleeve 14 is lifted during the last part of the stroke, clamping pressure applied by spring 18 will be constant and can be set at any desired pressure by adjusting retaining collar 20.

Many components to be assembled in this manner have, or can be provided with locating holes which can be used for alignment on the locating pins of the apparatus. For unperforated parts simple sockets or other external alignment means may be used.

It is understood that minor variation from the form of the invention disclosed herein may be made without departure from the spirit and scope of the invention, and that the specification and drawings are to be considered as merely illustrative rather than limiting.

I claim:
Apparatus for resistance spot soldering, comprising:
a base;
non-conductive supports on said base having locating means to hold parts to be soldered;
an upright post on said base;
sleeve means slidably mounted on said post;
an upper stop and a lower stop adjustably fixed to said post above and below said sleeve means;
a spring between said sleeve means and said upper stop biasing the sleeve means downwardly;
a soldering head slidably mounted on said sleeve means and having a pair of downwardly extending elecrodes mounted on said soldering head and spaced to engage the parts to be soldered at spaced positions where held on said supports;
manual lever actuating means to move said soldering head relative to said sleeve means into a depressed position bringing said electrodes against the parts to be soldered, said actuating means including toggle linkage having an over-center action for releasibly clamping the soldering head in said depressed position;
the effective stroke of said actuating means being greater than the initial clearance between said electrodes and the parts to be soldered, so that, when the electrodes are bearing on the parts to be soldered, said sleeve means is lifted against said spring, which biases the electrodes into firm contact with said parts with a constant predetermined pressure controlled solely by the adjustment of said upper stop.

References Cited by the Examiner
UNITED STATES PATENTS

| | | | |
|---|---|---|---|
| 422,434 | 3/1890 | Norton et al. | 228—46 X |
| 1,186,354 | 6/1916 | Williams | 228—59 X |
| 2,109,461 | 3/1938 | Brown | 219—91 |
| 2,258,189 | 10/1941 | Meisner | 219—91 |
| 2,332,368 | 10/1943 | Burtenshaw | 219—85 X |
| 2,369,240 | 2/1945 | Kirby | 219—85 |
| 2,394,822 | 2/1946 | Teplitz | 219—86 |

RICHARD M. WOOD, *Primary Examiner.*

B. A. STEIN, *Assistant Examiner.*